UNITED STATES PATENT OFFICE.

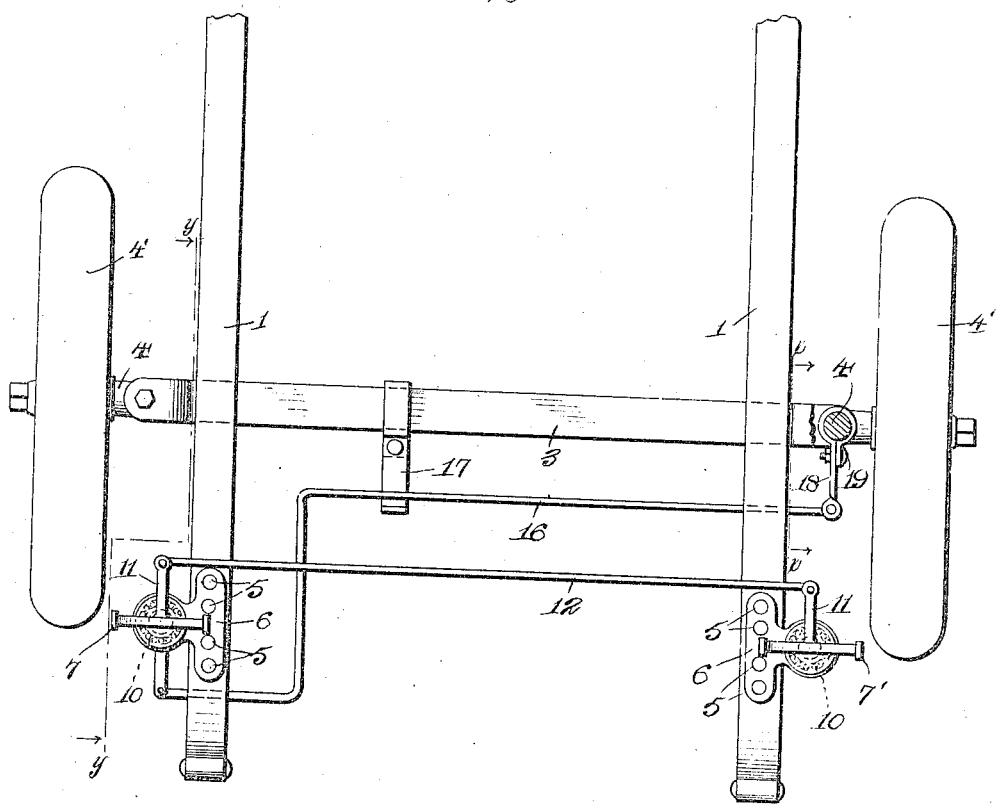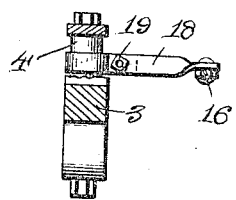

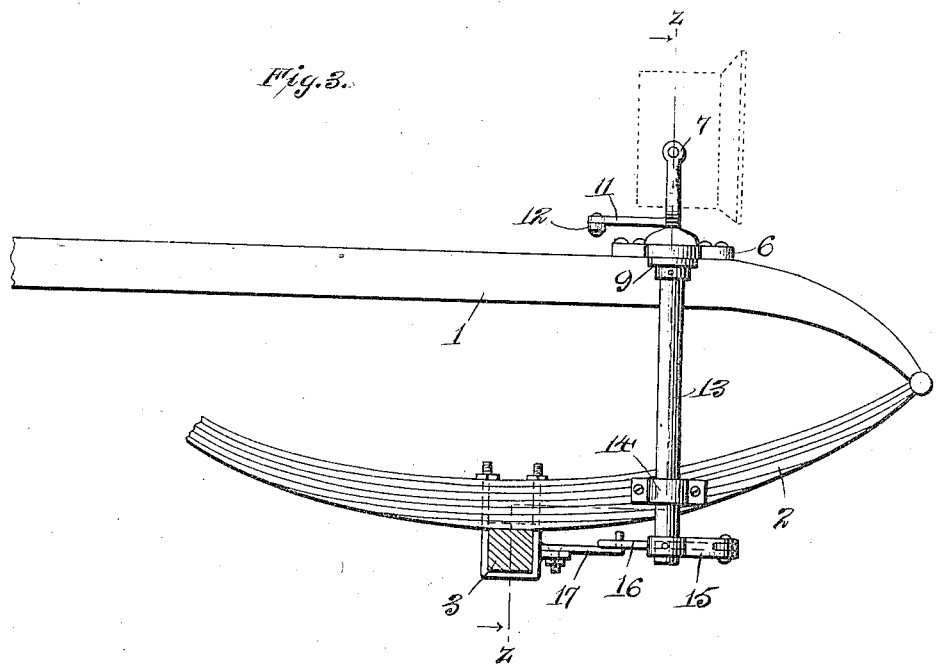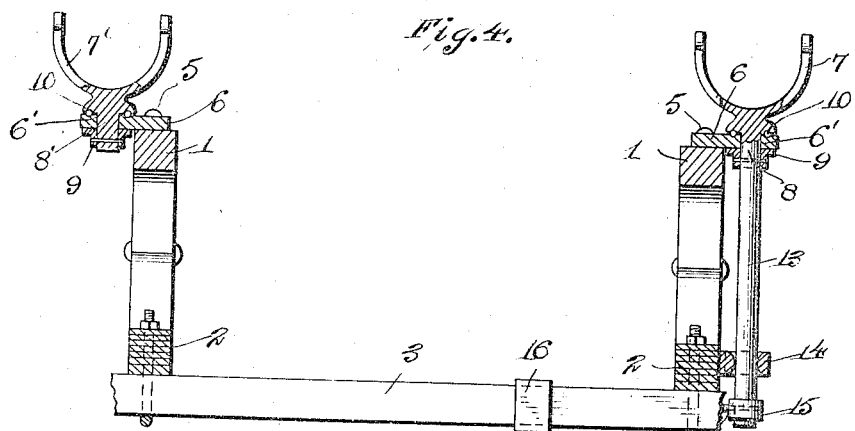

CLARENCE E. WALTERS AND ALVA M. WALTERS, OF RED OAK, IOWA.

HEADLIGHT-CONTROLLER FOR VEHICLES.

987,843.  Specification of Letters Patent.  Patented Mar. 28, 1911.

Application filed October 3, 1910. Serial No. 585,055.

*To all whom it may concern:*

Be it known that we, CLARENCE E. WALTERS and ALVA M. WALTERS, citizens of the United States, and residents of the city of Red Oak, county of Montgomery, and State of Iowa, have invented certain new and useful Improvements in Headlight-Controllers for Vehicles, of which the following is a specification.

Our invention relates to headlights for automobiles and other vehicles and has for its object the production of controlling means therefor, whereby the rays of light cast thereby will be always projected in the same direction as that in which the vehicle is moving, whether the vehicle be traveling straight ahead or rounding a curve.

A further object is the provision of a headlight controlling means of the character mentioned which shall be of durable and economical construction and efficient in operation.

Other objects will appear hereinafter.

With these objects in view our invention consists in headlight controlling mechanism for vehicles, characterized as above mentioned and in certain details of construction and arrangements of parts all as will be hereinafter more fully described and particularly pointed out in the appended claim.

Our invention will be more readily understood by reference to the accompanying drawings forming a part of this specification, and in which, Figure 1 is a partially sectional top plan view of the front end portion of the frame work of an automobile to which is applied a headlight controlling mechanism embodying the preferred form of our invention, Fig. 2 is a detail section taken on line $x$—$x$— of Fig. 1, Fig. 3 is a section taken on line $y$—$y$ of Fig. 1, and Fig. 4 is a section taken substantially on line $z$—$z$ of Fig. 3.

Referring now to the drawings we have illustrated therein the front end portion of a conventional automobile, the latter as shown comprising the longitudinally extending frame bars 1 at the under sides of the forward extremities of which are arranged the vehicle springs 2. Secured as indicated to said springs, is the front axle 3, in the bifurcated respective extremities of which are mounted the steering knuckles 4, wheels 4' being mounted upon the latter.

Rigidly secured by means of rivets or other suitable securing devices 5 to the upper sides of the frame bars 1 at the forward ends thereof, are bearing members 6. Mounted for oscillatory movement in the bearing members 6 are lamp brackets 7 and 7', vertically extending depending stems 8 and 8' respectively of said brackets passing through circular openings 6' provided in said bearing members. Collars 9 pinned to said stems at the under sides of said bearing members prevent longitudinal movement of said stems in said bearing members. In order to alleviate friction ball bearings 10 are interposed between the adjacent surfaces of the said brackets and bearing members. Formed integral with and rearwardly projecting from said lamp brackets are arms 11. The rearward extremities of the arms 11 are connected by means of a link 12, so that said lamp brackets will turn in unison.

The stem 8 is provided with an elongated extension 13 which extends at its lower end through a guide member 14 secured upon the adjacent side of the adjacent spring 2. Said guide member loosely engages said stem so that free movement of the spring will not be interfered with. Rigidly secured to and forwardly projecting from the lower extremity of the extension 13 is an arm 15 to the outer extremity of which is pivotally connected one extremity of a laterally extending angular link 16. The link 16 intermediate its extremities, is slidably supported upon a horizontally disposed arm 17 which is secured upon the axle 3, the opposite extremity of said link being pivotally connected to the forward extremity of an arm 18, which is attached to the steering knuckle 4 by means of the bolt and nut 19, the rearward end of said arm encircling the vertically extending portion of said steering knuckle.

With the arrangement as set forth, it will be seen that an operative connection is established between the lamp brackets and the front or steering wheels of the vehicle, so that oscillatory movement of said wheels as in steering, will effect a simultaneous similar operation of the lamp brackets. With this arrangement then, the rays of light projected from the lamps mounted in the brackets 7 and 7' will always be directed in line with the direction of movement of the vehicle, and so that under all circumstances, whether traveling in a straight line or in a curve, the road in front of the vehicle will be lighted, thus averting many accidents.

The controlling means described is durable and economical, the same is of great efficiency in operation and is not susceptible to readily becoming inoperative, and the same is so designed as to be adapted for attachment to automobiles or other vehicles of various designs.

While we have shown what we deem to be the preferred form of controller we do not wish to be limited thereto, as there might be various changes made in the details of construction and the arrangements of parts described without departing from the spirit of the invention as comprehended within the scope of the appended claim. And although we have designed our controller with special reference to its employment in connection with automobiles, the same may be used upon any other vehicle to which it is applicable.

Having described our invention what we claim as new and desire to secure by Letters Patent is:

The combination with an automobile comprising a front axle, knuckle joints at each end of said axle, steering wheels on said knuckle joints, longitudinally extending springs secured to the top of said axle and longitudinally extending side frame bars having their forward ends secured to said springs, of laterally extending bearing members secured to the tops of said bars; lamp brackets having vertical stems extending through said bearing members, one of said stems being continued below the corresponding spring; a guide member secured to the side of the corresponding spring and loosely embracing said extending stem; a connection between said brackets for causing them to rotate in unison; a forwardly extending arm secured to the lower end of said extending stem; a forwardly extending arm secured to the knuckle joint on the side opposite said extended stem; a link connecting said arms, said link extending laterally and inwardly from said knuckle arm parallel with said axle, then forwardly and then laterally and outwardly to said stem arm; and a supporting arm secured to said front axle and slidably engaging said link, substantially as described.

In testimony whereof we have signed our names to this specification in the presence of two subscribing witnesses.

CLARENCE E. WALTERS.
ALVA M. WALTERS.

Witnesses:
A. E. SOURWINE,
ALLEN J. SOURWINE.